United States Patent [19]
Tuttle et al.

[11] Patent Number: 5,825,806
[45] Date of Patent: Oct. 20, 1998

[54] MODULATED SPREAD SPECTRUM IN RF IDENTIFICATION SYSTEMS METHOD

[75] Inventors: John R. Tuttle, Corrales, N. Mex.; Eugene P. Hoyt, Colorado Springs, Colo.; James C. Springett, La Crescenta, Calif.

[73] Assignee: Micron Technology, Inc., Boise, Id.

[21] Appl. No.: 348,274

[22] Filed: Nov. 30, 1994

Related U.S. Application Data

[63] Continuation of Ser. No. 32,384, Mar. 17, 1993, Pat. No. 5,539,775.
[51] Int. Cl.[6] ..................................................... H04B 1/69
[52] U.S. Cl. ........................ 375/200; 375/201; 375/367; 375/206
[58] Field of Search ................................... 375/200, 201, 375/202, 203, 206, 208, 367; 370/315, 320, 342, 515, 527

[56] References Cited

U.S. PATENT DOCUMENTS

| | | | |
|---|---|---|---|
| 4,581,769 | 4/1986 | Grimsley et al. | 455/226.1 |
| 4,817,113 | 3/1989 | Lundquist et al. | 375/200 |
| 4,941,150 | 7/1990 | Iwasaki | 375/200 |
| 5,099,495 | 3/1992 | Mikoshiba et al. | 375/202 |
| 5,103,459 | 4/1992 | Gilhousen et al. | 375/200 |
| 5,157,688 | 10/1992 | Dell-Imagine | 375/200 |
| 5,170,411 | 12/1992 | Ishigaki | 375/200 |
| 5,341,396 | 8/1994 | Higgins et al. | 375/206 |

*Primary Examiner*—Don N. Vo
*Attorney, Agent, or Firm*—Trask, Britt & Rossa

[57] ABSTRACT

A method for RF communication between transceivers in a radio frequency identification system that improves range, decreases multipath errors and reduces the effect of outside RF source interference by employing spread spectrum techniques. By pulse amplitude modulating a spread spectrum carrier before transmission, the receiver can be designed for simple AM detection, suppressing the spread spectrum carrier and recovering the original data pulse code waveform. The data pulse code waveform has been further encrypted by a direct sequence pseudo-random pulse code. This additional conditioning prevents the original carrier frequency components from appearing in the broadcast power spectra and provides the basis for the clock and transmit carrier of the transceiver aboard an RFID tag. Other advantages include high resolution ranging, hiding transmissions from eavesdroppers, and selective addressing.

21 Claims, 10 Drawing Sheets

BIPHASE CARRIER MODULATION $$\cos[\omega_0 t + \pi/2 \, PN_2(t)]$$

FIG. 5A

BIPHASE CARRIER MODULATION SPECTRUM

AMPLITUDE ON-OFF CARRIER MODULATION

$$[1+PN_1(t)]\cos[\omega_0 t]$$

FIG. 7A

AMPLITUDE ON-OFF CARRIER MODULATION SPECTRUM

FIG. 7B

AMPLITUDE ON-OFF PLUS
BIPHASE CARRIER MODULATION $$[1+PN_1(t)]\cos[\omega_0 t + \pi/2 PN_2(t)]$$

FIG. 8A

AMPLITUDE ON-OFF PLUS BIPHASE
CARRIER MODULATION SPECTRUM

MODULATED SPREAD SPECTRUM IN RF IDENTIFICATION SYSTEMS METHOD

PRIOR APPLICATION

This is a continuation of application Ser. No. 08/032,384, filed Mar. 17, 1993, now U.S. Pat. No. 5,539,775.

FIELD OF THE INVENTION

This invention relates to data communication with low power radio frequency (RF) transceivers, specifically to data communication between RF identification (RFID) tags and an operator (interrogator), and more particularly, to using spread spectrum techniques to simplify the tag receiver design, reduce tag cost, increase the range and reduce interference on the RF communication channel.

BACKGROUND OF THE INVENTION

An RFID tag is a small radio transceiver that can be attached to a movable article to help keep track of its whereabouts and status. A small, light-weight, inexpensive tag is desirable. To miniaturize the tag, the size of the circuitry is reduced by using an integrated circuit (IC) design. The simpler the circuit, the smaller the resulting IC becomes, thereby reducing the cost.

Operational environment factors can disrupt the reliability of these weak communication links. Reflective and refractive properties of the environment introduce possible multipath errors, and outside RF sources introduce interference in the received signal.

SUMMARY OF THE INVENTION

The principal object of this invention is to provide a method by which an RFID tag can communicate more information over much greater distances through harsher RF environments than previously available, while reducing the size and cost of the tag IC.

The secondary objects of this invention are to provide:

simple AM reception by the receiver circuit without having to use complex synchronization schemes, external frequency references such as quartz crystals and complex circuits like Costas loops;

interrogator transmission power to be less than or equal to 1 Watt, allowing unlicensed operation within FCC guidelines;

extension of the range from interrogator to RFID tag;

limitation of eavesdropping of signals by outside parties; and selective addressing of particular tags or communicating with more than one tag simultaneously in any given transmission.

These and other objects are achieved by modulating a spectrally spread carrier with a pulse code waveform representing information pertaining to the article to which the tag is attached.

One advantage of using a spread spectrum modulated signal is the enhanced interference rejection obtained during the demodulation process. The effect is a signal to noise gain over traditional narrow band broadcasting techniques.

Using spread spectrum techniques gives good range with relatively little complexity on the tag. The high complexity is contained in the interrogator design.

Other advantages are: selectively addressing a particular receiver, pulse code multiplexing allowing addressing of a plurality of receivers in any given transmission, broadcast transmissions with low density power spectra for signal hiding, message encryption to discourage eavesdroppers, and high resolution ranging between transmitter and receiver.

Although this invention was specifically designed for RFID tag communication, there are applications for it in hand-held walkie-talkies, pagers, mobile phones, cordless telephones, cordless microphones and musical instruments, cordless computer network communication links, and intercoms.

DESCRIPTION OF THE PREFERRED EMBODIMENT OF THE INVENTION

Figure 1:
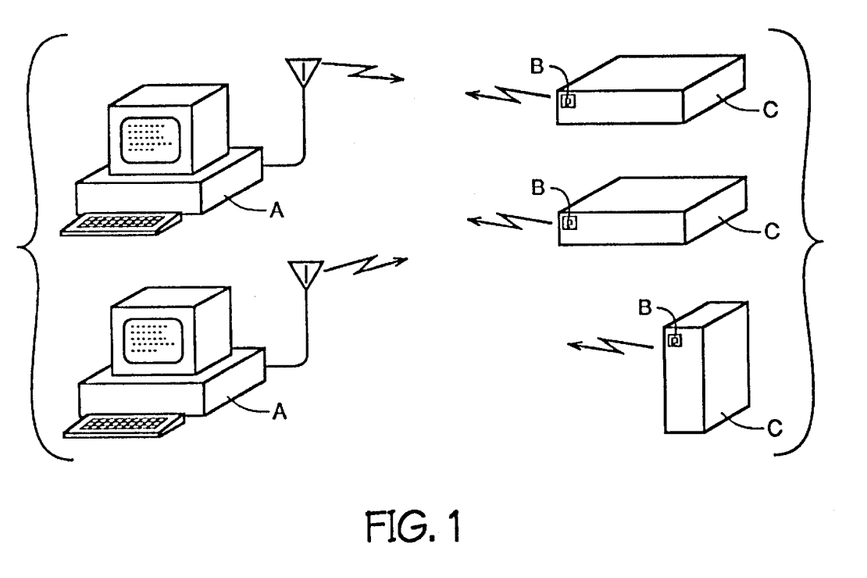
FIG. 1 is a simplified drawing of the type of radio frequency identification system to which this invention applies.

Referring now to FIG. 1, a typical arrangement of an RFID system includes a plurality of operator controlled interrogators A that communicate via RF links with a plurality of RFID tags B which are attached to articles C located somewhere in the vicinity of the interrogators.

An interrogator transmits a signal to a particular tag requesting or updating the status of the article associated with that tag. Status information can include the article's name, owner, address, destination, pertinent dates, weight, etc.

The tag receives the signal and awakens from its power conserving quiescent sleep state. The tag interprets the request and decides on a response which is then transmitted back to the requesting interrogator. A receiver in the interrogator analyzes the return signal, determining the status of the article. Its location can be determined by triangulation with multiple interrogators or multiple antennas. This information is then displayed to the operator.

Figure 2:
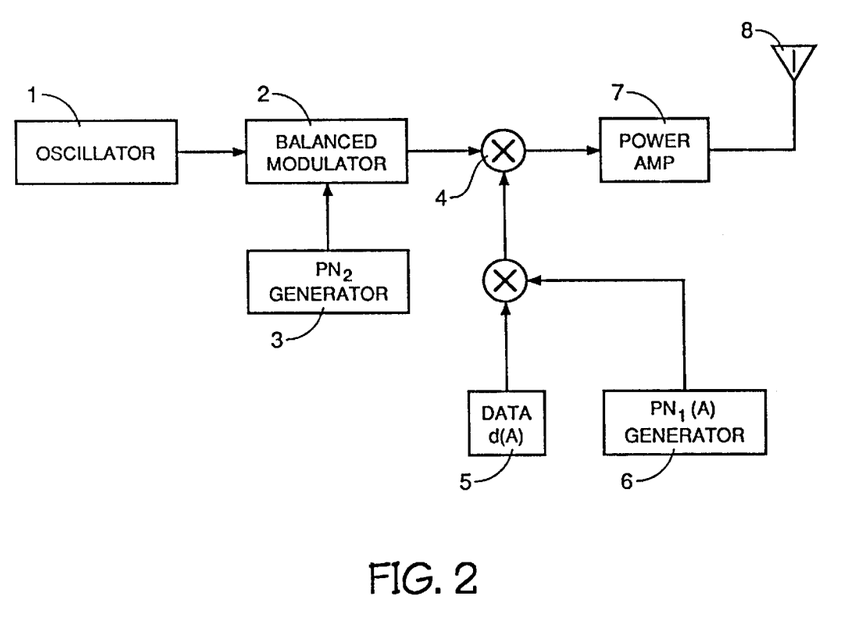
FIG. 2 is a block diagram of the transmitter part of the interrogator.

Referring now to FIG. 2, which is a block diagram of the transmitter part of the interrogator transceiver, a crystal controlled oscillator 1 generates a constant amplitude sinusoidal carrier with a frequency of 2441.75 MHz.

This carrier is modulated in the balanced modulator 2 by a pseudo-random direct sequence pulse code, PN2, generated by the pseudo-noise (PN) generator 3. PN2 has a chip rate of about 40Mega-chips per second.

The resulting spectrally spread carrier is then modulated 4 by another pulse code waveform generated by combining a data waveform 5 and another pseudo-noise waveform, PN1(t) 6. The resulting signal to be transmitted is sent to a power amplifier 7, and then to the antenna 8.

The data waveform, d(t) represents information to be transmitted to the REMOTE and has a data rate of about 2 mega-bits per second. PN1(t) has a chip rate equal to or less than PN2. In this embodiment PN1(t) and d(t) are multiplied together to form the modulating unipolar waveform, 1+PN1(t)d(t).

Figure 3:
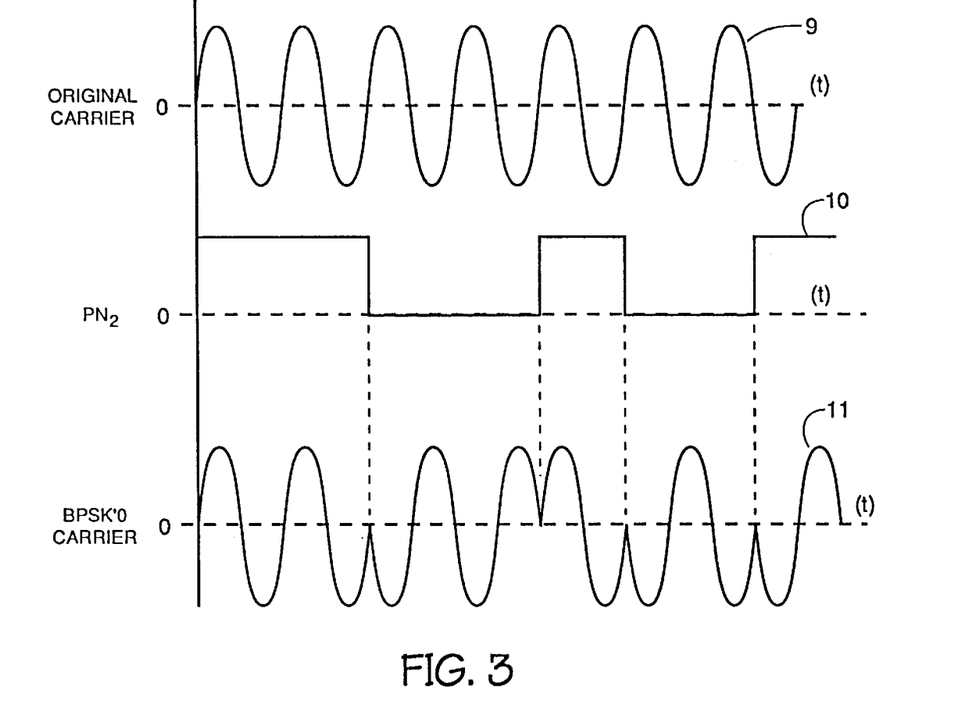
FIG. 3 is a series of time domain plots representing binary phase shift keying (BPSK) the carrier with a direct sequence pseudo-random pulse code.

The waveforms of FIG. 3 refer in detail to operation of the first balanced modulation of the carrier. Modulation occurs by binary phase shift keying (BPSK) the original constant amplitude carrier 9, with the PN2 pseudo-random direct sequence pulse code 10. During the time when PN2 is low, the carrier is keyed with a 180 degree phase shift from when PN2 is high 11. For illustration purposes, the sinusoidal carrier is shown at a much lower frequency than has been suggested for this embodiment.

Figure 4:
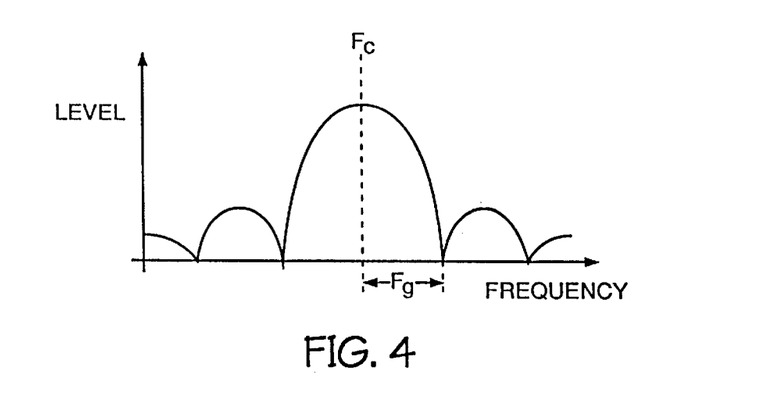
FIG. 4 is a frequency domain plot of an ideally spectrally spread carrier.
Figure 5A:
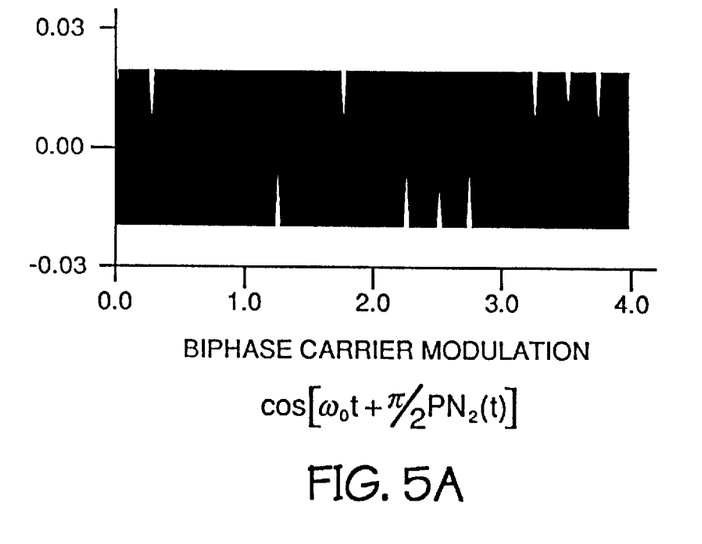
FIGS. 5A–5B are a realistic time domain plot and frequency domain plot of the BPSK spectrally spread carrier.
Figure 5B:
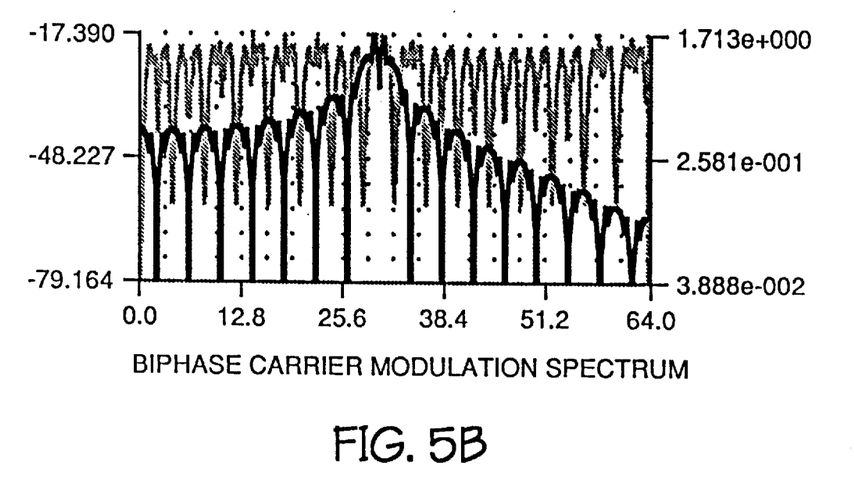

The resulting waveform has a power spectrum which is ideally spread according to the (sin(x)/x)**2 function shown in FIG. 4. The center of the main lobe is at the original carrier frequency Fc. The main lobe bandwidth (null to null) is now twice the clock frequency of the PN2 waveform Fg. A more realistic representation of the time domain signal and its power spectra appears in FIG. 5a and FIG. 5b respectively.

Figure 6:
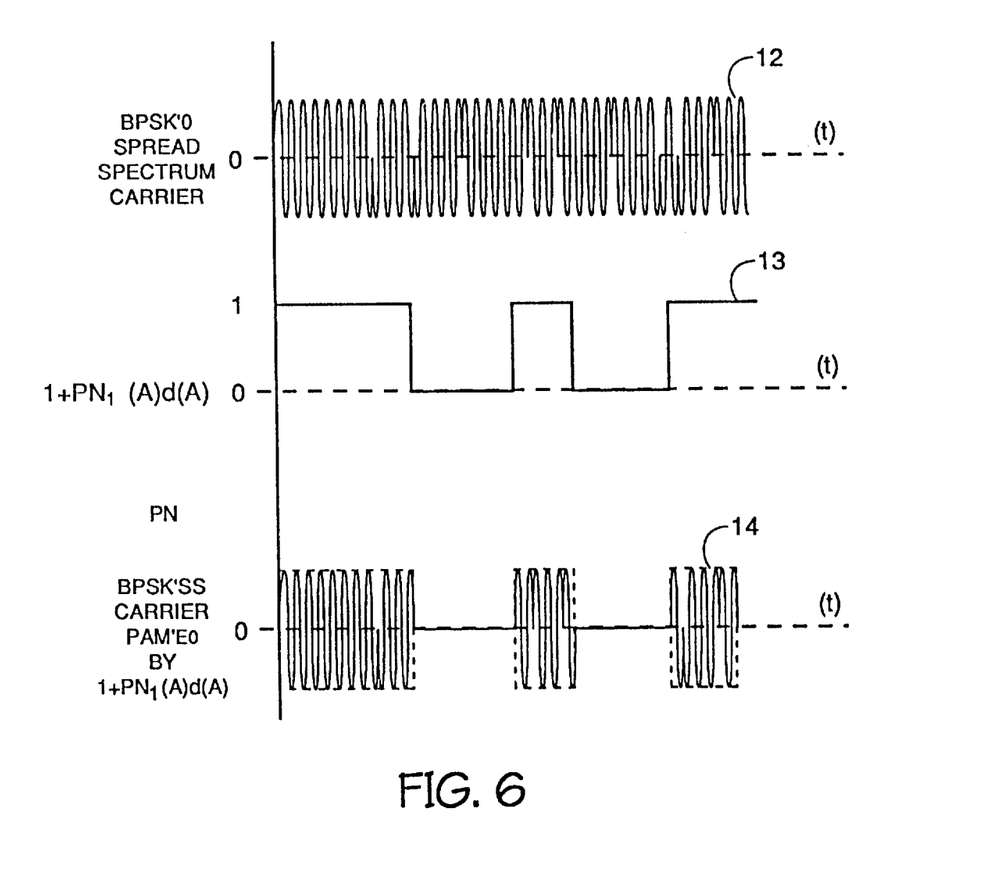
FIG. 6 is a series of time domain plots representing pulse amplitude modulating the spectrally spread carrier with a pulse code waveform.

FIG. 6 illustrates in detail the operation of the modulation of the spectrally spread carrier by the pulse code waveform 1+PN1(t)d(t). The spectrally spread carrier 11 of FIG. 3 is viewed over a much greater time period 12. One must keep in mind that there are over 150 cycles of the original carrier for every bit (amount of time between possible changes, high-to-low or low-to-high) of the 1+PN1(t)d(t) modulating waveform 13.

Figure 7A:
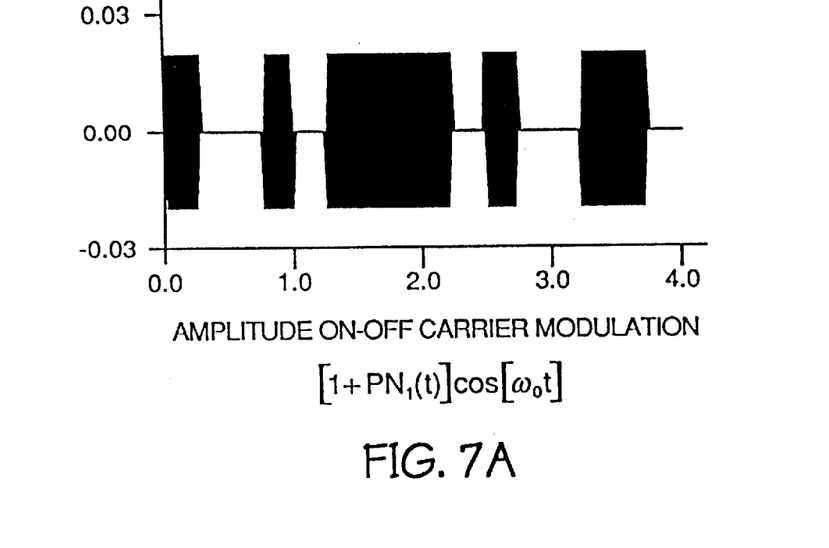
FIGS. 7A–7B are a realistic time domain plot and frequency domain plot of a pulse amplitude modulated non-spectrally spread carrier.
Figure 7B:
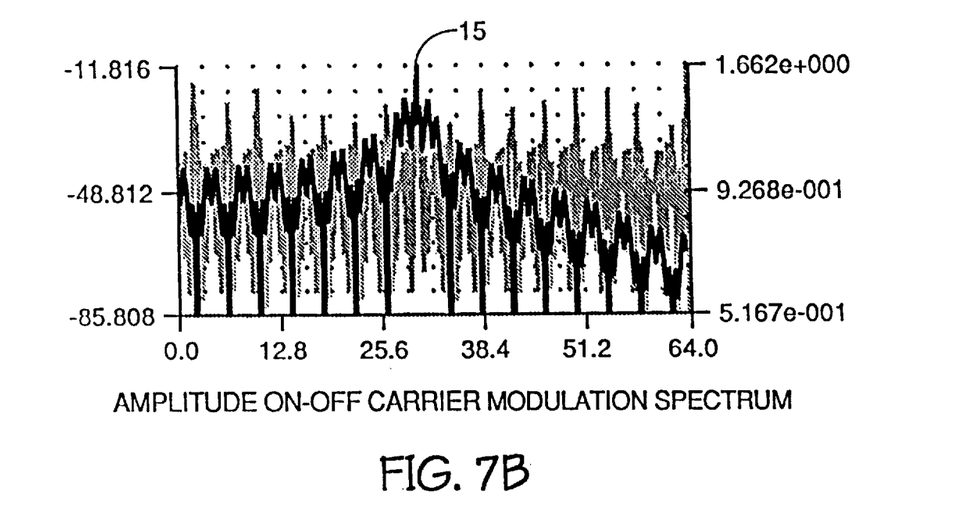
Figure 8A:
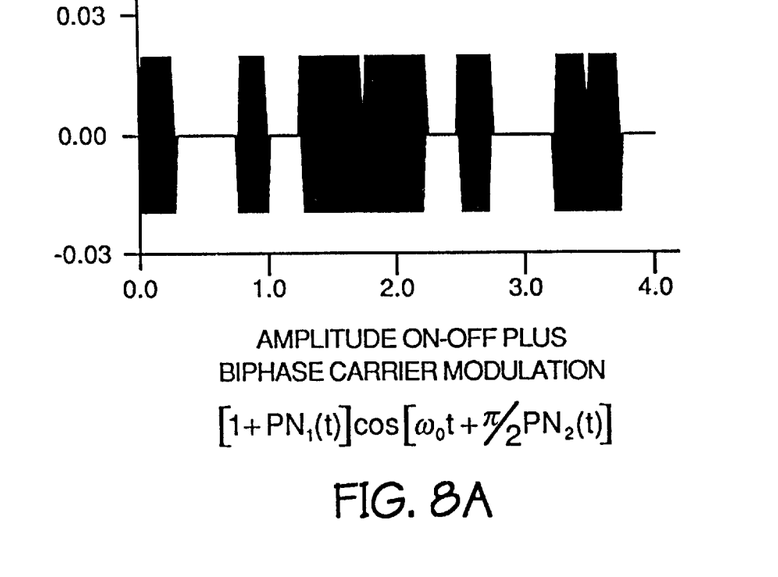
FIGS. 8A–8B are a realistic time domain plot and frequency domain plot of a pulse amplitude modulated spectrally spread carrier.
Figure 8B:
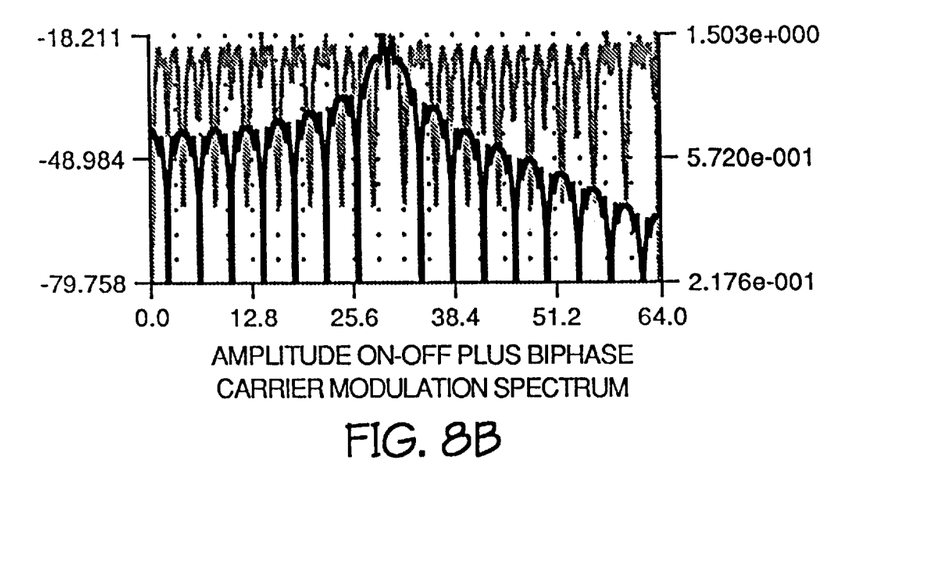

Pulse amplitude modulation involves multiplying the spread spectrum carrier by the modulating waveform 14. It is important to note that pulse amplitude modulating a non-spectrally spread carrier results in a power spectrum with an undesirable spike 15 at the carrier frequency as shown in FIG. 7a and FIG. 7b. By spectrally spreading the carrier, the resultant power spectra is more acceptable as shown in FIG. 8a and FIG. 8b.

Figure 9:
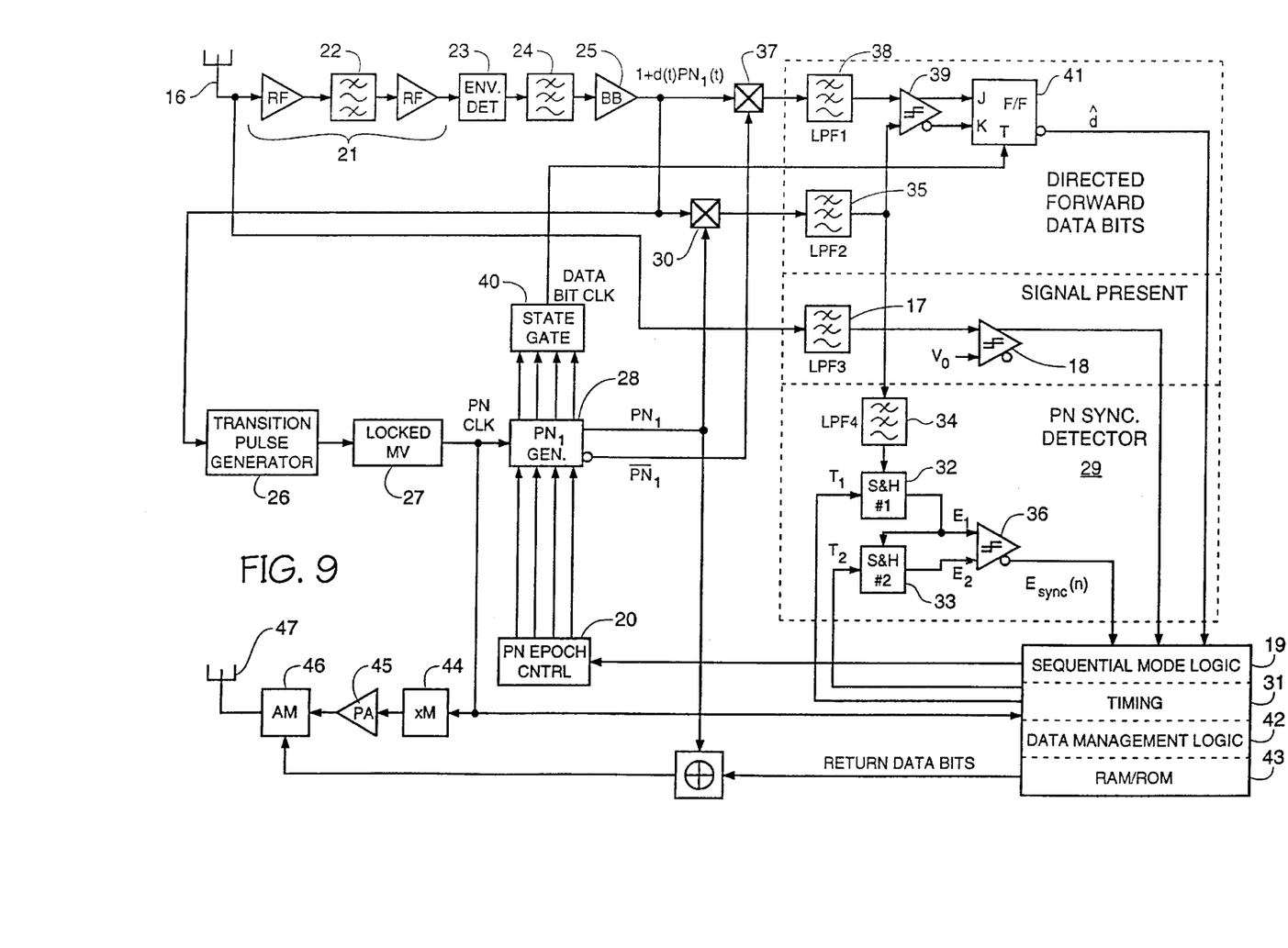
FIG. 9 is a block diagram of the transceiver in the REMOTE RFID tag.

Referring now to FIG. 9, the receiver portion of the remote RFID tag receives signals via an antenna 16. In order to sense the existance of a signal meaningful to the REMOTE, the signals are sent to a lowpass filter 17. This voltage is compared to a value Vo in a comparator 18. If the voltage is greater, the comparator outputs a true, informing the sequential mode logic 19 that a signal is present. The receiver is then initialized, awakening from its quiescent sleep state and the PN1(t) waveform generation circuitry is set to acquisition mode through the PN epoch controller 20.

In an awakened REMOTE, the signal arriving at the antenna 16 is sent to several stages of RF (S-band) amplification and filtering 21. As much RF amplification as attainable is provided. The bandpass filter characteristics are a center frequency of the original carrier (2441.75 MHz) and a bandwidth of around 84 MHz, which corresponds to the main lobe of the transmitted signal. Although this bandpass filtering is shown as a single block 22, the circuitry accomplishing this filtering will likely be distributed throughout the RF amplifier circuits.

The resulting signal is sent to a full wave envelope demodulator 23, which recovers the amplitude modulating waveform as 130 PN1(t)d(t). Some added lowpass filtering 24 and baseband amplification 25 further increases the voltage level of the waveform to a more useful value (approx. 0.5 Volts peak-to-peak).

Figure 10:
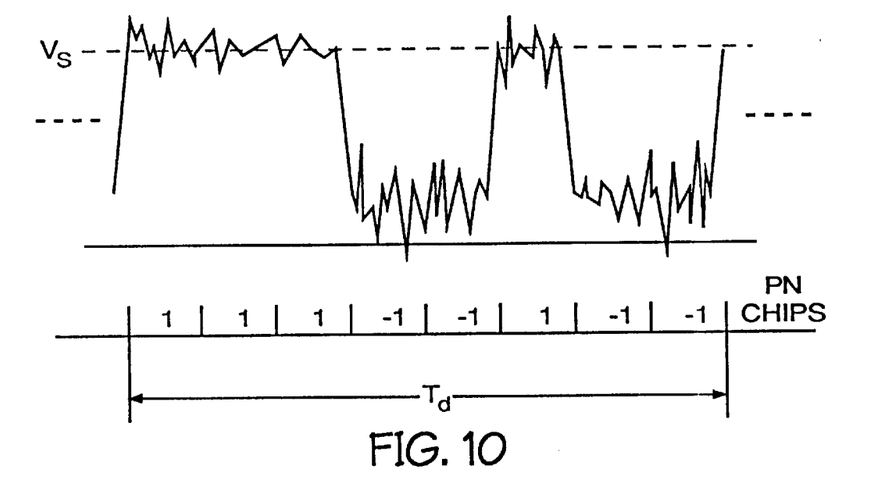
FIG. 10 is a time domain plot representing one data bit period of the received signal 1+PN1(t)d(t) after the carrier has been removed.

As seen in FIG. 10, the waveform 1+PN1(t)d(t) is essentially two-level in nature, exhibiting positive and negative transitions between the limits of 0 and Vs which correspond to the PN1(t) waveform, and a small amount of additive noise or interference. Here, PN1(t) is represented by the chip sequence: 1 1 1 −1 −1 1 −1 −1, and spans exactly one data bit period, Td. It can be assumed during this time period that d(t)=1; if it were a −1, the waveform would be inverted. In order to facilitate synchronization, d(t) is equal to 1 and thus non-transitioning during a preamble portion of the transmitted signal.

Referring back to FIG. 9, the transition pulse generator 26 acts to differentiate the 1+PN1(t)d(t) waveform, producing "spikes" at the transition times, which are then rectified (absolute value) to furnish a unipolar train of transition derived pulses. Spectrally, this waveform is rich in the PN1(t) code clock frequency. It's injected into a free-running multivibrator 27 (or a phase-locked loop oscillator) which produces a synchronized pulse for every chip of the received signal. In effect, the waveform produced is a relatively stable PN1 clock waveform used by the PN1 generator 28. Once synchronization to the incoming PN1 sequence is achieved, the locked multivibrator 27 is used as the tag's clock for processing the incoming data and commands. If a return transmission is requested, the locked multivibrator 27 becomes the source for the tag transmitter carrier frequency.

The PN1 generator 28, running from the PN-clock waveform, generates the tag's version of the PN1(t) chip sequence. This will initially be time offset by an integral number of chips (n) from the sequence that makes up the received waveform 1+PN1(t)d(t). The PN Sync Detector 29 eliminates this offset.

Figure 11:
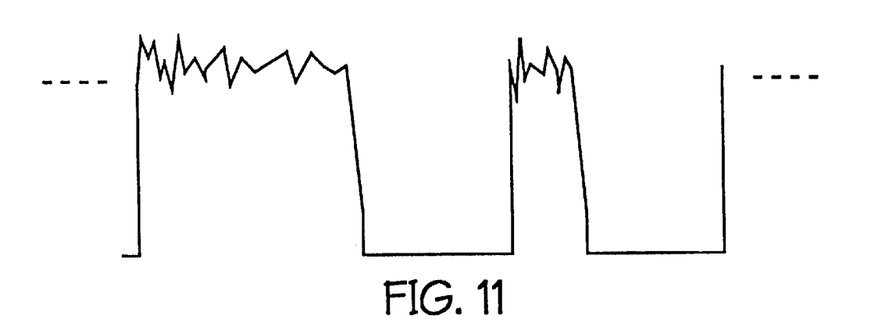
FIG. 11 is a time domain plot representing one data bit period of the received signal without carrier that has been gated by PN1(t) in sync.
Figure 12:
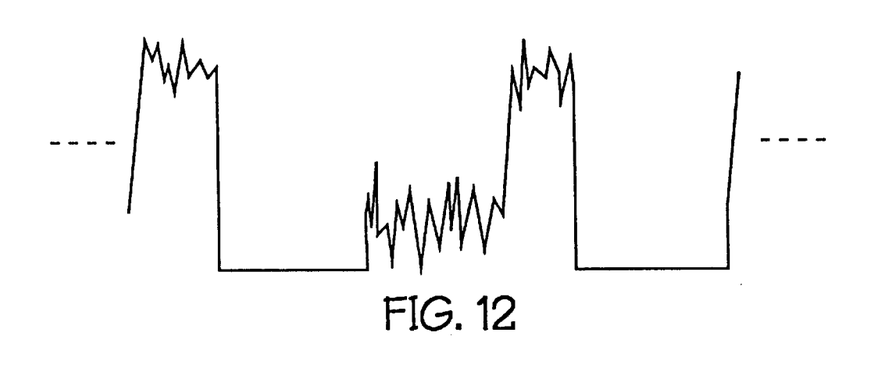
FIG. 12 is a time domain plot representing one data bit period of the received signal without carrier that has been gated by PN1(t) that is 3 chips out of sync.

The PN Sync Detector accomplishes its objective by doing a sequential correlation comparison. A MOSFET switch 30 gates the 1+PN1(t)d(t) code received using the PN1 code generated. If the two codes are in sync, the output of the gate is a waveform as shown in FIG. 11, having an average value around Vs/2. If the two codes are unaligned, say offset by three chips, the gate output is a waveform as shown in FIG. 12, having an average value around Vs/4 or less. By usual spread spectrum standards, correlation discrimination by a factor of two would be considered poor, but under very high signal to noise ratio (SNR) conditions, which are present in the forward link, it is acceptable.

The proper, in-sync starting point for the PN1 code sequence is discovered by generating PN1 at all possible starting points and recording the results. Each starting point represents a waveform which is a possible candidate for being the correct in-sync PN1 waveform. The candidate having the largest correlation value will be the one used. A more detailed explanation of this process follows.

Upon initialization, the Sequential Mode Logic 19, in conjunction with the timing events T1 and T2 31, initializes the sample-and-hold (S&H) memories 32 and 33. T2 occurs later than T1. The event of T1 causes the output of LPF4 34 to be stored in S&H #1 as value E1. Likewise, T2 results in E1 being stored in S&H #2 as value E2. LPF4 is responsible for smoothing the correlation voltage, producing a more accurate representation of the correlation than what is available from the broader LPF2 35 which is matched to the bit period. Initially, the sequential mode logic sets the PN epoch controller 20 to produce a shift-register word which is loaded into the PN generator's shift-register directing the generator to produce the PN1code sequence at a particular starting point called epoch-1. If the code sequence is made up of L chips, there are L possible starting points and L possible epochs. (In the example waveform in FIG. 4, L=8.) The PN sync detector must find epoch-n corresponding to the largest correlation, with 1<=n <=L. Once the generator is producing PN1 based on epoch-1, the correlation value output from LPF4 is transferred to S&H #1 at T1 and then to S&H #2 at T2.

Next, the chip sequence based on epoch-2 is generated. The output from LPF4 is again sent to S&H #1 at T1. If E1 is greater than E2, the correlation at epoch-2 is greater than the correlation at epoch-1. This is communicated by the output of the comparator 36 to the sequential mode logic which transfers E1 to S&H #2 and makes note of the epoch value n (in this case 2) for which the transfers occurred. If E1 had been less than E2, then E2 remains unchanged. The acquisition search continues with epoch-3 and so on until all epoch values have been tried. In the end, E2 will represent the largest correlation value found, and the sequential mode logic will know which epoch value to use.

There is the possibility that proper alignment was not achieved because a correlation value mistake was made due to noise. To avoid this, the entire acquisition process is repeated two more times. PN synchronization success is declared if the epoch chosen is the same for all three tries (or two out of three tries).

Once PN1 has been synchronized with the received signal, the REMOTE is ready to detect data. Remember, throughout the acquisition period the LOCAL interrogator has been transmitting with d(t) equal to 1. This period will last for several hundred data bit periods. The start of a message packet will be indicated by a data transition from 1 to −1, followed by a block of unique bits which the data management logic will recognize as packet synchronization.

Figure 13:
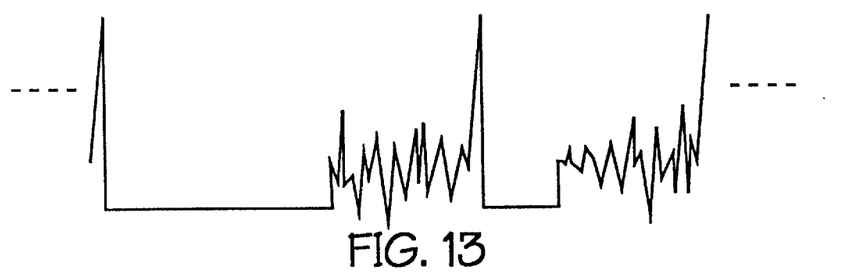
FIG. 13 is a time domain plot representing one data bit period of the received signal without carrier that has been gated by the logical compliment of PN1(t) in sync when d(t)=1.
Figure 14:
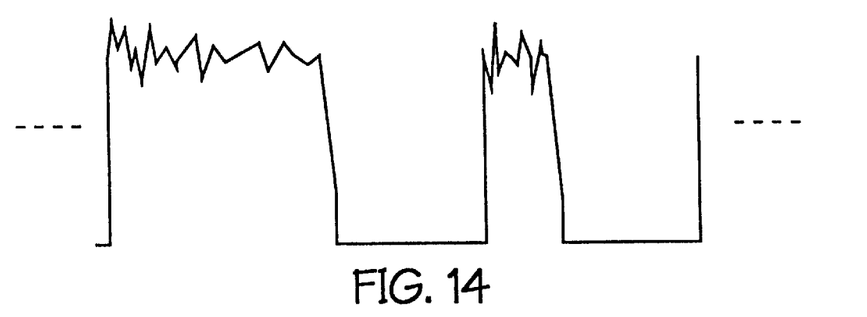
FIG. 14 is a time domain plot representing one data bit period of the received signal without carrier that has been gated by PN1(t) in sync when d(t)=1.
Figure 15:
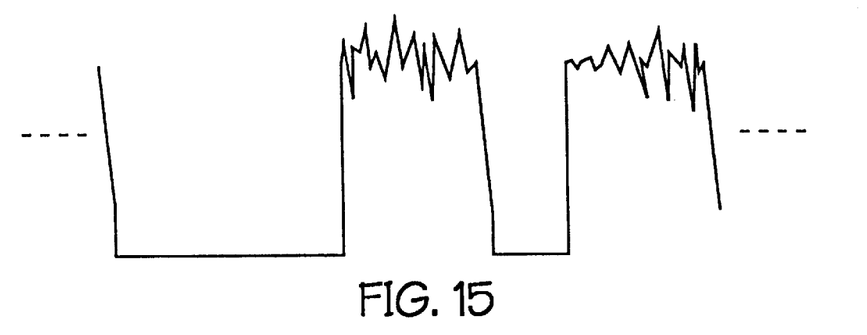
FIG. 15 is a time domain plot representing one data bit period of the received signal without carrier that has been gated by the logical compliment of PN1(t) in sync when d(t)=−1.
Figure 16:
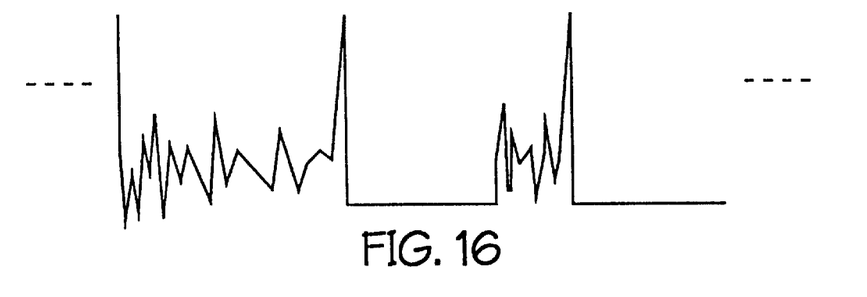
FIG. 16 is a time domain plot representing one data bit period of the received signal without carrier that has been gated by PN1(t) in sync when d(t)=−1.

Data detection itself takes place as the received signal 1+d(t)PN1(t) is gated 30 by the tag's generated PN1 and sent to LPF2 35. Likewise, it is gated by PN1's logical compliment 37 and sent to LPF1 38. When d(t) is equal to 1, the input to LPF1 is the waveform seen in FIG. 13, and the corresponding input to LPF2 is seen as FIG. 14. The average value of the waveform sent to LPF2 is clearly greater. When d(t) is equal to −1, the inputs to LPF1 and LPF2 are as shown in FIG. 15 and FIG. 16 respectively. Here, the average value of the waveform sent to LPF1, is greater.

The two low pass filters, LPF1 and LPF2 are approximations to matched filters (if a simple RC filter is used, then RC=1.3/(2pi*Td)). They function to maximize the SNR at the end of the bit period, Td, for input to the comparator 39. End of bit period timing is provided by a state AND gate 40 operating from the PN1 generator. This gate toggles a J-K flip-flop 41 which temporarily stores the value of d(t) until it can be transferred into data management logic 42 and RAM 43.

Each sequential data bit provides its own detection reference to the comparator. Also, as the received signal level varies due to movement of the tag or interrogators or changes in the RF environment, the data detection decision reference is self-adjusting, giving rise to the designation "per-bit" reference for data detection.

Once the forward link data has been detected, the data management logic 42 executes required actions and assembles the return link data packet message.

The transmitter within the tag will generate the return link carrier by multiplying the PN1 clock frequency produced by the locked multivibrator 27 by a factor M using a frequency multiplying circuit 44. This carrier is then amplified 45 and pulse amplitude modulated 46 by the return data packet waveform. Although an amplitude modulation scheme is shown, other modulation schemes using spread spectrum techniques are possible and desirable. This signal is then sent to the antenna 47. The power amplifier stage may be less than 0.5 milliwatts due to the power available within the tag. Because of this low radiated power, spectrally spreading the return link carrier may not be necessary, and an additional pseudo-noise waveform analogous to PN1 need not further encrypt d(t). When higher powers are desired, a spectrally spread scheme would be used to satisfy FCC unlicensed rules. To extend the range of the system, spread spectrum techniques are desirable in the tag transmitter.

While the preferred embodiments of the invention have been described, modifications can be made and other embodiments may be devised without departing from the spirit of the invention and the scope of the appended claims.

What is claimed is:

1. A communication system, comprising:

signal conditioning and transmitting circuitry to produce and transmit a twice modulated data signal; and a receiver system that is remote from the signal conditioning and transmitting circuitry and that comprises:

receiving and processing circuitry to receive the transmitted twice modulated data signal and to produce therefrom a recovered modulated data signal including a carrier component and a data signal component;

synthesizing and synchronizing circuitry to receive the recovered modulated data signal and produce a synthesized signal synchronized with the carrier component; and processing and comparing circuitry to receive the recovered modulated data signal and the synthesized signal, and to produce a signal indicative of the data signal component responsive to signals including the recovered modulated data signal and the synthesized signal.

2. The communication system of claim 1, wherein the receiver system is a first receiver system and the communication system further comprises additional receiver systems that are remote from the signal conditioning and transmitting circuitry, and the additional receiver systems each comprise receiving and processing circuitry, synthesizing and synchronizing circuitry, and processing and comparing circuitry like that of the first receiver system.

3. The communication system of claim 1, wherein the signal conditioning and transmitting circuitry is included in an interrogator.

4. The communication system of claim 1, wherein the synthesized signal includes pseudo noise signals.

5. The communication system of claim 1, wherein the twice modulated data signal is a spread spectrum signal.

6. The communication system of claim 1, wherein the receiver system further comprises memory to store the signal indicative of the data signal component.

7. The communication system of claim 1, wherein the receiver system further comprises transmitting circuitry to transmit signals to the signal conditioning and transmitting circuitry.

8. The communication system of claim 1, wherein the recovered modulated data signal includes an epoch, and the synthesized signal has an epoch essentially identical to the epoch of the recovered modulated data signal.

9. The communication system of claim 1, wherein the recovered modulated data signal includes a chip sequence, and the synthesized signal has a chip sequence identical to the chip sequence of the recovered modulated data signal.

10. The communication system of claim 1, wherein the synthesizing and synchronizing circuitry includes a transition pulse generator that produces pulses in response to transitions in the recovered modulated data signal.

11. The communication system of claim 1, wherein the receiver system is a tag for attachment to an article.

12. The communication system of claim 1, wherein the receiver system is included in a pager.

13. The communication system of claim 1, wherein the transmitted twice modulated data signal has power of less than one watt.

14. The communication system of claim 1, wherein the receiver system assumes a quiescent state from which it is awakened in response to reception of the transmitted modulated data signal.

15. A communication system, comprising:

signal conditioning and transmitting circuitry to produce and transmit a modulated data signal; and a receiver system that is remote from the signal conditioning and transmitting circuitry and comprises:

receiving and processing circuitry to receive the transmitted modulated data signal and to produce therefrom a recovered modulated data signal including a carrier component and a data signal component;

synthesizing and synchronizing circuitry to receive the recovered modulated data signal and produce a synthesized signal synchronized with the carrier component, and produce an inverse of the synthesized signal; and processing and comparing circuitry to receive the recovered modulated data signal and the synthesized signal and to produce a signal indicative of the data signal component responsive to the recovered modulated data signal, the synthesized signal, and the inverse of the synthesized signal.

16. The communication system of claim 15, wherein the transmitted modulated data signal is a twice modulated data signal.

17. The communication system of claim 15, wherein the receiver system is a first receiver system and the communication system further comprises additional receiver systems that are remote from the signal conditioning and transmitting circuitry, the additional receiver systems each comprising receiving and processing circuitry, synthesizing and synchronizing circuitry, and,processing and comparing circuitry like that of the first receiver system.

18. The communication system of claim 15, wherein the modulated data signal is a twice modulated data signal that is produced by modulating a second carrier with a first modulated data signal, which is produced by modulating a data signal with a first carrier.

19. The communication system of claim 18, wherein the first and second carriers are pseudo noise signals.

20. The communication system of claim 15, wherein the receiving and processing circuitry includes an amplitude demodulator.

21. A communication system, comprising:

signal conditioning and transmitting circuitry to produce and transmit a modulated data signal, wherein the modulated data signal comprises a twice modulated data signal that is produced by modulating a second carrier with a first modulated data signal, which is produced by modulating a data signal with a first carrier, and the first and second carriers are pseudo noise signals; and a receiver system that is remote from the signal conditioning and transmitting circuitry and comprises:

receiving and processing circuitry to receive the transmitted modulated data signal and to produce therefrom a recovered modulated data signal including a carrier component and a data signal component;

signal production circuitry to produce a synchronized signal that is synchronized with the carrier component; and processing and comparing circuitry to receive the recovered modulated data signal and the synchronized signal, and to produce a signal indicative of the data signal component responsive to signals including the recovered modulated data signal and the synchronized signal.

* * * * *

UNITED STATES PATENT AND TRADEMARK OFFICE
CERTIFICATE OF CORRECTION

PATENT NO : 5,825,806
DATED : October 20, 1998
INVENTOR(S) : Tuttle et al.

It is certified that error appears in the above-identified patent and that said Letters Patent is hereby corrected as shown below:

| | | |
|---|---|---|
| Column 1 | line 21 | change "light-weight" to --lightweight,--. |
| Column 3 | line 26 | change "waveform, d(t)" to --waveform d(t) 5,--. |
| Column 3 | line 29 | after "embodiment" insert a comma. |
| Column 3 | line 47 | after "5b" insert a comma. |
| Column 4 | line 1 | change "existance" to --existence--. |
| Column 4 | line 21 | change "130 PN1(t)d(t)" to --1 + PN1 (t)d(t)--. |
| Column 4 | line 22 | change "increases" to --increase--. |
| Column 4 | line 41 | change "It's" to --It is--. |
| Column 4 | line 59 | after "Detector" insert --29--. |
| Column 5 | line 26 | after "detector" insert --29--. |
| Column 5 | line 66 | after "FIG. 16" insert a comma. |
| Column 6 | line 1 | after "LPF2" insert a comma. |

Signed and Sealed this

Thirtieth Day of May, 2000

Attest:

*Attesting Officer*

Q. TODD DICKINSON

*Director of Patents and Trademarks*